June 21, 1966  W. S. RAYNOR  3,257,007
APPARATUS FOR FEEDING STACKS OF ARTICLES
Original Filed Sept. 9, 1960  5 Sheets-Sheet 1

INVENTOR
WARREN S. RAYNOR

ATTORNEYS

June 21, 1966   W. S. RAYNOR   3,257,007
APPARATUS FOR FEEDING STACKS OF ARTICLES
Original Filed Sept. 9, 1960   5 Sheets-Sheet 5

United States Patent Office

3,257,007
Patented June 21, 1966

1

3,257,007
APPARATUS FOR FEEDING STACKS OF ARTICLES
Warren S. Raynor, Port Hope, Ontario, Canada, assignor to Mathews Conveyer Company, Ellwood City, Pa., a corporation of Pennsylvania
Original application Sept. 9, 1960, Ser. No. 54,997. Divided and this application Nov. 28, 1962, Ser. No. 246,285
4 Claims. (Cl. 214—8.5)

This invention relates to conveying apparatus, and more particularly to conveying apparatus especially adapted to convey stacks of articles such as cartons stacked in layers in a unit load to a lift which may form part of a stack handling apparatus in which certain handling operations are performed on articles in the stack. The lift may, for example, form part of an article unstacking apparatus such as that disclosed in my copending application Serial No. 54,997, filed September 9, 1960, of which this application is a division.

The practice of transporting or handling large quantities of cartons in unit loads consisting of a multilayered stack, frequently supported on a pallet has become quite widespread in recent years since such unit loads may be readily transported from place-to-place by fork-lift trucks. The advantages of this practice are such that many machines have been developed to assemble cartons into a unit load.

In certain industries, of which the bottled beverage industry is a primary example, the production plant must not only prepare unit loads for shipping or warehousing, but also receives substantial quantities of cartons which are likewise in the form of a unit load. In the bottled beverage industry the bottling plant continuously receives unit loads of empty bottles. In the larger plants, the cartons of used empty bottles are often stacked manually upon pallets as they are collected from stores, warehouses, etc., so that the cartons with empty bottles may be transported within the bottling plant by fork-lift trucks. Shipments of new bottles are frequently received in cartons stacked in unit loads. In either case, the unit load must be unstacked within the plant. Manual handling and unloading of returned cartons of empty bottles requires a substantial labor force.

In my copending application Serial No. 54,997, there is described and claimed in detail an article unstacking apparatus which automatically unstacks a stack of articles by successively removing the uppermost layer from the stack.

One object of this invention is to provide conveying apparatus for feeding stacks of articles to an article handling machine such as the article unstacking apparatus disclosed in my copending application Serial No. 54,997 automatically with the requirements of the stack handling machine.

Another object of the invention is to provide conveying apparatus for automatically feeding a stack of articles to a lift when the lift is located to receive the stack of articles.

In the achievement of the foregoing, and other objects, a machine embodying the present invention includes a lift which is operable to raise and lower a stack or unit load of articles within a lift shaft defined by a fixed frame. A stack handling conveyer passes through the lift shaft immediately above the position assumed by the lift at its lower limit of travel. Loaded pallets or stacks of articles are fed onto the stack handling conveyer from a storage conveyer upon which the stacked articles are loaded directly from a fork-lift truck or other means. The storage conveyer is a reciprocating gravity conveyer which is continuously reciprocated to maintain a continuous line of successive article stacks in abutting relationship rearwardly of a stop located at the discharge end of the storage conveyer.

At the discharge end of the reciprocating gravity conveyer, a tilting discharge section is operable, when the lift is at its lowermost limit, to tilt upwardly and retract the stop to gravitationally discharge the endmost stack onto the stack handling conveyer. Movement of the reciprocating gravity conveyer is stopped until the transferred stack reaches a location on the stack handling conveyer above the lift.

The stack handling conveyer is power driven and as the stack is conveyed toward the lift, a pallet upon which the preceding stack was supported is conveyed out the opposite side of the lift shaft. The arrival of the new stack in position above the lift automatically starts movement of the reciprocating gravity conveyer and simultaneously lowers the tilting section to permit the line of loaded pallets or article stacks to move down one step until the endmost stack engages the stop.

Arrival of the new stack in position above the lift automatically energizes the lift driving motor to elevate the lift upwardly within the shaft.

As described in more detail in my copending application Serial No. 54,997, the lift moves upwardly within the shaft and the article unstacking apparatus successively removes the uppermost layer of articles from the stack until the stack is completely removed from the lift. The lift is then automatically lowered to its lower end limit. Arrival of the lift at its lower end limit energizes the stack handling conveyer and also actuates the discharge mechanism of the reciprocating gravity conveyer to transfer another stack to the stack handling conveyer. As the second loaded pallet or article stack moves toward the lift, the unloaded pallet, if the preceding stack was supported by a pallet, is driven by the stack handling conveyer outwardly clear of the lift shaft.

Other objects and features of the invention will become apparent by reference to the following specification taken in conjunction with the accompanying drawings.

Figure 1:
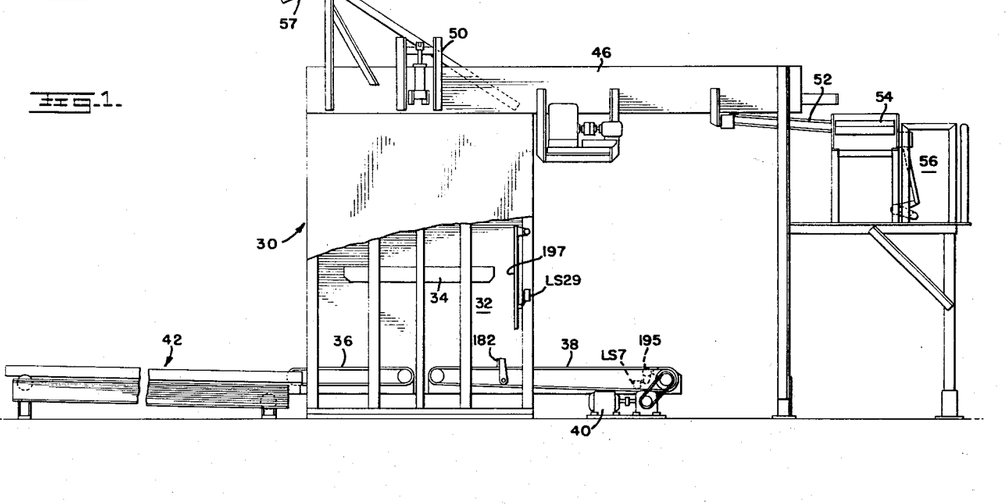
FIG. 1 is a side elevational view of a machine embodying the present invention with certain parts broken away or omitted for the sake of clarity.
Figure 2:
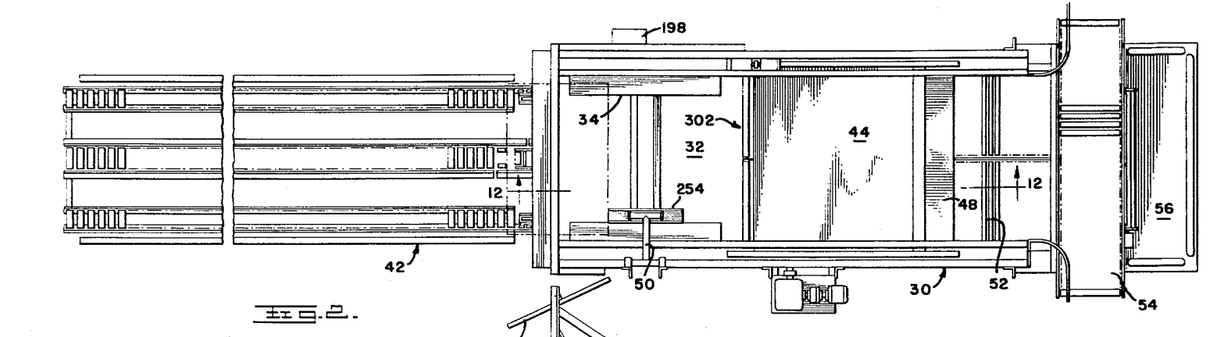
FIG. 2 is a plan view of the machine of FIG. 1.

The general organization of the article unstacking apparatus disclosed in my copending application Serial No. 54,997 may be best appreciated by reference to FIGS. 1 and 2 of the drawings. The machine includes a frame designated generally 30 which defines a vertical shaft 32 within which a lift platform 34 is raised and lowered by apparatus described more fully in my copending application Serial No. 728,243, filed April 14, 1958. Although the machine described in application Serial No. 728,243 and the embodiment described herein refer to unit loads or stacks of articles supported on a pallet, the use of a pallet is not essential to the instant invention and it will become apparent that the presence or absence of a pallet has no influence on the unstacking operation. Extending through the lower end of lift shaft 32 is a pallet handling conveyor which includes an infeed section 36 and a discharge section 38 both of which are driven simultaneously from a motor and reducer assembly indicated at 40. Loaded pallets are fed onto infeed section 36 from a reciprocating gravity conveyor designated generally at 42 which has stop means (not shown in FIGS. 1 and 2) operable to release one loaded pallet at a time to infeed conveyor 36 when lift platform 34 is disposed in its lowermost position. The lowermost position of lift platform 34 locates the platform below the upper surfaces of conveyor sections 36 and 38.

Storage conveyer assembly

The function of storage conveyer assembly 42 is to receive loaded pallets intermittently, as from forklift trucks, to form the loaded pallet into a line in which the pallets are in head-to-tail relationship, and to supply a single loaded pallet at a time to infeed conveyer section 36 when the pallet lift is in position to receive the loaded pallet. The structural details of storage conveyer assembly 42 are best shown in FIGS. 3 through 8 of the drawings.

Figure 3:
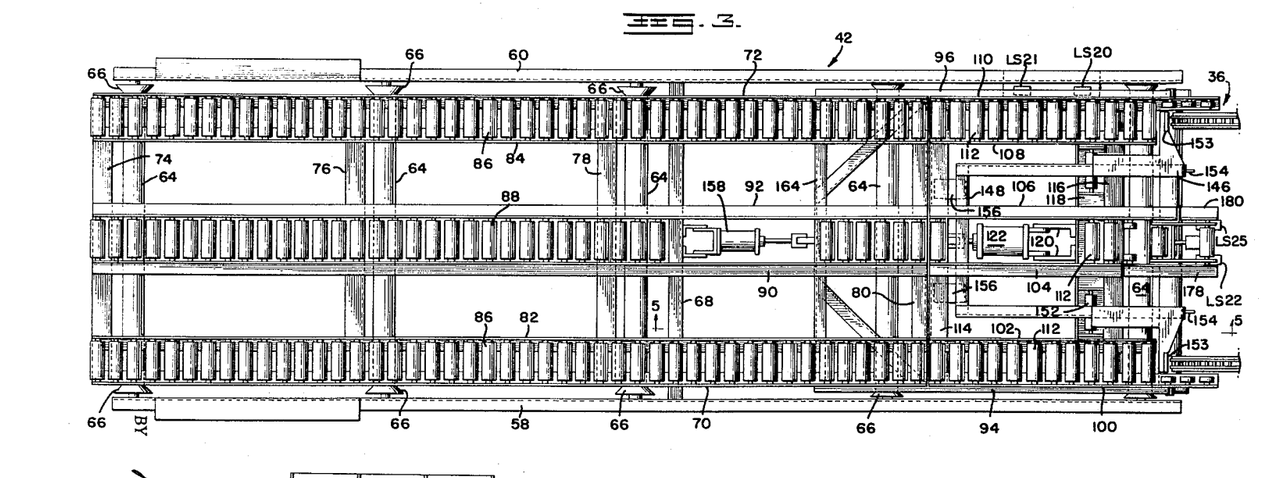
FIG. 3 is a plan view of the reciprocating gravity storage conveyer.
Figure 4:
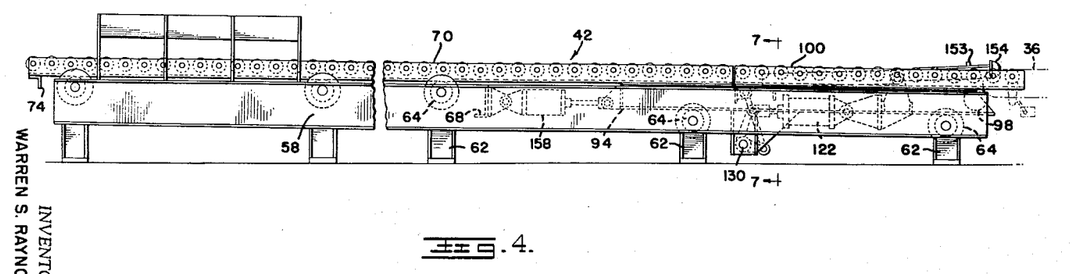
FIG. 4 is a side elevational view of the conveyer shown in FIG. 3.

Referring first to FIGS. 3 and 4, storage conveyer 42 includes a pair of spaced parallel side rails 58 and 60 which are fixedly mounted upon suitably located support members such as 62 so that side rails 58 and 60 form a longitudinally extending rigid framework which is inclined downwardly to the right in the fashion best seen in FIG. 4. At longitudinally spaced locations, a plurality of support rollers 64 are rotatably supported between side rails 58 and 60 for rotation about horizontal axes extending transversely between the side rails. Near each outer end of each roller 64, an outwardly flaring conical flange 66 is formed to guide a reciprocating frame supported upon rollers 64 in movement longitudinally of side rails 58 and 60. As best seen in FIG. 4, rollers 64 are so located as to define a supporting surface which is inclined downwardly toward the right in FIG. 4. The two rollers 64 located adjacent the right-hand end of the side rails in FIG. 4 are offset downwardly to accommodate the shape of the reciprocating frame which will be described in greater detail below. In addition to rollers 64, a rigid cross-frame member 68 is secured, as by welding, between side frame members 58 and 60 approximately midway between the ends of the members. The structure described thus far may be considered to be the fixed frame or base of a reciprocating gravity conveyer in that all of the parts described are fixedly mounted and do not move, with the exception of the rotation of the various rollers 64 about their axes.

The reciprocating frame of conveyer 42 is mounted upon rollers 64 and includes a pair of spaced parallel outer side frame members 70 and 72 which are rigidly connected to each other by four transversely extending cross-frame members 74, 76, 78 and 80 welded between members 70 and 72. Longitudinally extending frame members 82 and 84 are spaced inwardly from the respective frame members 70 and 72 to support outer series of conveying rollers which are freely rotatably mounted between the various longitudinally extending frame members as best appreciated from FIG. 3. In addition to the outer series of conveying rollers 86, a central series of conveying rollers 88 is supported between inner longitudinally extending frame members 90 and 92 which are welded to the upper surfaces of the transversely extending frame member 74 through 80 respectively. All of the longitudinally extending frame members 70, 72, 82, 84, 90 and 92 extend from the receiving (left-hand end in FIGS. 3 and 4) to frame member 80 and terminate at frame member 80.

The reciprocating frame is extended beyond the right-hand end of the last mentioned longitudinally frame members by longitudinally extending channel shaped frame extensions 94 and 96 which longitudinally overlap the right-hand (FIGS. 3 and 4) ends of the respective frame members 70 and 72 and are welded along the longitudinal overlap in such a manner that the upper surface of extensions 94 and 96 form a continuation of the lower surfaces of members 70 and 72. At the extreme right-hand end of extensions 94 and 96, a transversely extending pivot shaft 98 is rotatably supported between extensions 94 and 96 for rotation about an axis extending transversely across the discharge end of the conveyer. Six longitudinally extending channel frame members 100, 102, 104, 106, 108 and 110, are welded to the upper surface of axle 98 and extend rearwardly from the axle in alignment with longitudinal frame members 70, 82, 90, 92, 84 and 72. Conveying rollers 112 are rotatably supported between the various frame members 100 through 110.

Frame members 100 through 110 are rigidly interconnected by transversely extending cross-frame members 114 and 116. As best appreciated by a comparison of FIGS. 5 and 6, the frame portion which includes longitudinal members 100 through 110, 114 and 116 may be tilted upwardly about the pivotal axis of axle 98, as shown in FIG. 5 or may be disposed in a normal position in which the rollers 112 mounted upon the tilting frame define a continuation of the conveying surface of the left-hand portion of the conveyers shown in FIGS. 3 and 4.

Figure 5:
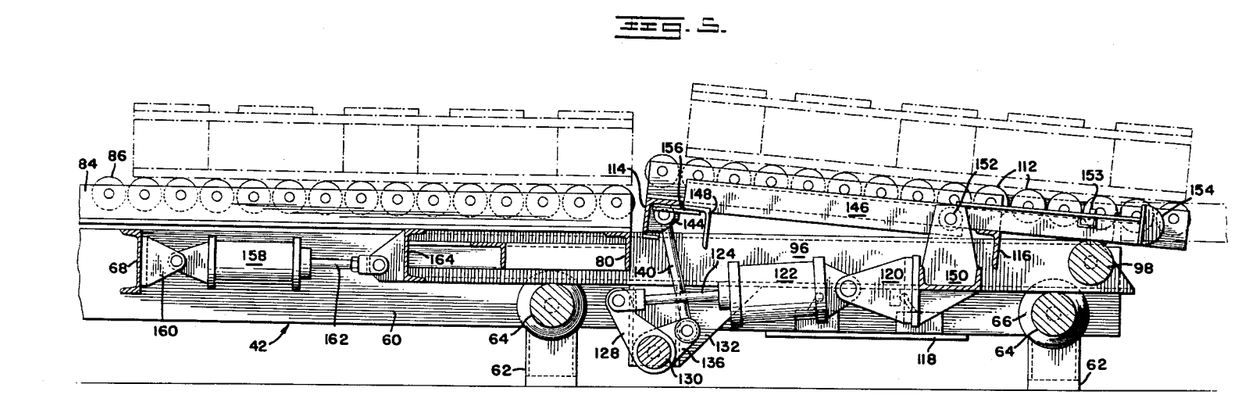
FIG. 5 is a detail cross-sectional view of the discharge end of the reciprocating gravity conveyer taken on the line 5—5 of FIG. 3.
Figure 6:
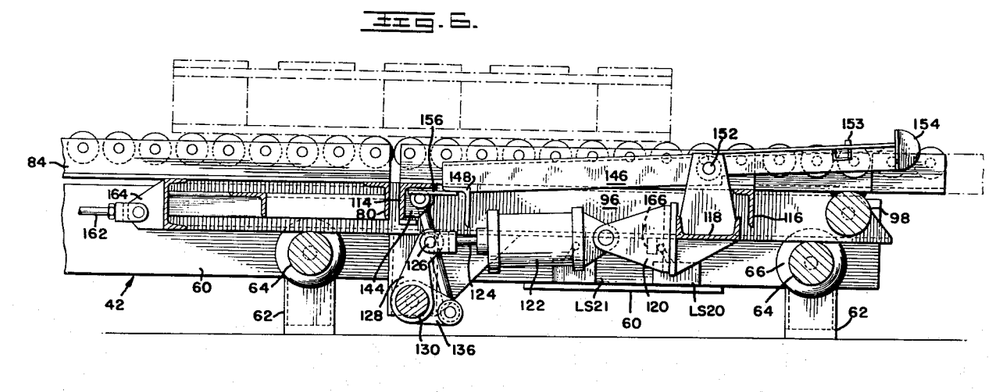
FIG. 6 is a view similar to FIG. 5 showing the discharge section in its normal rest position.
Figure 7:
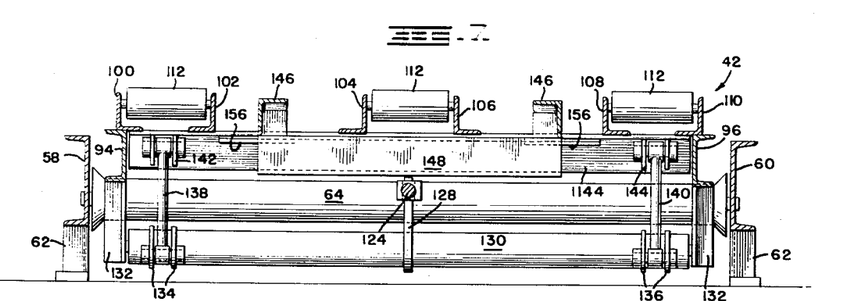
FIG. 7 is a cross-sectional view of the reciprocating gravity conveyer taken on the line 7—7 of FIG. 4.

To drive the tilting frame between the positions shown in FIGS. 5 and 6, a transversely extending channel member 118 is welded between side frame extensions 94 and 96. A pair of rearwardly projecting lugs 120 are welded to frame member 118 to pivotally support an air motor 122 whose piston rod 124 is pivotally coupled at 126 to a crank 128. Crank 128 is welded to a shaft 130 which is rotatably supported between downwardly projecting frame members 132 which are fixedly secured to each of frame extensions 94 and 96. As best seen in FIG. 7, crank 128 is connected to shaft 130 approximately midway the ends of the shaft; adjacent each end of the shaft, like crank assemblies 134 and 136 are welded to shaft 130 and are pivotally connected at their outer ends to links 138 and 140 respectively. Each of links 138 and 140 is pivotally connected at its upper end to lug assemblies 142 and 144 welded to frame member 114.

To control movement of loaded pallets from the storage conveyer, a stop assembly is located at the discharge end of the conveyer. Referring first to FIG. 3, the stop assembly includes a pair of parallel longitudinally extending angle members 146 which are connected to each other by a cross-piece 148 welded to each of members 146 at the rearward end of the members. As best seen in FIGS. 5 and 6, each of the members 146 is pivotally supported upon cross-piece 118 by means of lug assemblies 150 including pivot pins 152 passing through the respective members 146. At the forward ends of each of members 146, upwardly projecting teeth such as 153, 154 are fixedly secured. As best appreciated from FIG. 6 teeth 153 and 154 may, in one position of stop assembly, project above the conveying surface of conveyer 42 to stop pallets at the discharge end of the conveyer.

As best seen in FIGS. 5 and 6, the location of the pivotal axes established by pins 152 is such that the stop assembly is unbalanced about the pivotal axis in a counterclockwise direction as viewed in FIGS. 5 and 6. A pair of projecting plates 156 welded to cross-frame member 114 project forwardly from member 114 to underlie cross-frame member 148 of the stop assembly. When the stop assembly is in the position shown in FIG. 6, cross-member 148 rests upon plates 156 and is gravitationally maintained in that position. This permits teeth 153 and 154 to project upwardly above the conveying surface of conveyer 42 to form stops. When the tilting section is elevated to the position shown in FIG. 5, plates 156 lift the left-hand end of the stop assembly upwardly and pivot the assembly about the axis defined by pins 152 so that teeth 153 and 154 are pivoted downwardly below the conveying surface.

To reciprocate the reciprocating frame upon the base frame, an air motor 158 is coupled to cross-frame member 68, which is part of the fixed or base frame, by a lug assembly 160. The piston rod 162 of motor 158 is pivotally connected to a frame member 164 which is fixedly secured to the reciprocating frame. Motor 158 is connected to a source of air under pressure by means to be described below in a manner such that piston rod 162 may be cyclically reciprocated within motor 158. The reciprocating action is controlled by means of a pair of limit switches, LS20 and LS21, mounted upon a plate secured to fixed frame member 60 and located to be alternately actuated by a striker 166 bolted to the lower surface of frame extension 96. The control connections are such that as piston rod 162 is driven to its fully extended position, striker 166 contacts the striker of limit switch LS20 which electrically reverses the pneumatic supply to motor 158 to cause the piston rod 162 to be retracted within the motor. The reciprocating frame then is driven in the reverse direction until striker 166 contacts the striker limit switch LS21 whereupon the direction of movement of piston rod 162 is reversed.

The reciprocating frame portion of conveyer 42 is normally driven in reciprocating movement. As best seen in FIG. 4, the conveying surface defined by the various rollers on the reciprocating frame slopes downwardly toward the discharge end of conveyer 42. The slope is selected to be such that a loaded pallet, if placed upon conveyer 42 with the reciprocating frame held stationary, would remain stationary. The slope is selected to be such that if the inertia of the loaded pallet is overcome and the pallet is once set in motion on the conveyer, it will continue to move until stopped. Once stopped, the slope is insufficient to cause the loaded pallet to move on the conveyer unless acted upon by some outside force. The outside force is supplied by the reciprocating movement imparted from motor 158. The net result is that while motor 158 is reciprocating, the pallets are urged toward the discharge end of conveyer 42 with a force only barely sufficient to keep them in motion and which exerts only a very little force when the pallets are held against movement by the stop assembly. Thus, assuming a single loaded pallet to be supported upon the conveyer and engaging the stop assembly, a second loaded pallet placed upon the receiving (left-hand in FIGS. 3 and 4) end of conveyer 42 would be slowly conveyed along the upper surface of conveyer 42 until it came into abutment with the pallet engaging the stop. Since the conveying force is extremely small, the force with which the second loaded pallet collides with the first is very small.

Operation of the stop assembly to discharge a single loaded pallet at a time is controlled by the pallet lift and will be described in greater detail below. It should be noted that the tilting frame assembly is mounted upon and reciprocated with the reciprocating frame assembly.

*Infeed and discharge conveyer sections*

Infeed section 36 and discharge section 38 may best be termed as a single conveyer since they are simultaneously driven in the same direction from a common drive assembly which includes motor and reducer assembly 40. A conveyer assembly of substantially similar construction is employed in the pallet loading machine disclosed in my copending application Serial No. 728,243 and hence this portion of the device will be described in general terms with the understanding that details are more fully disclosed in my copending application identified above.

As is implied from FIG. 3, in which the left-hand end of infeed section 36 appears at the extreme right-hand end of FIG. 3, both conveyer sections 36 and 38 include a pair of transversely spaced power driven chains which are aligned with the outermost roller sections of conveyer 42. Midway between the idler sprockets of the chains of conveyer section 36, a central roller section is located in longitudinal alignment with the central roller section of conveyer 42.

At the receiving end of the centrally extending roller section on infeed conveyer 36, a floating roller assembly 170 is located in position to be engaged by a pallet located against stop teeth 154 on conveyer 42 when the reciprocating frame is near the forward limit of a stroke. A floating roller 172 (FIG. 7A) is supported between a pair of bell cranks such as 174 which are pivotally supported for rotation about the axis of an adjacent roller 176 supported between longitudinal frame members 178 and 180 which are part of the fixed frame of conveyer 36. Bell cranks 174 are connected at their lower ends by a strap 175 and are gravitationally biased about the pivotal axis of roller 176 by counterweight 179 in such a manner that roller 172 normally projects above the conveyer surface. When engaged by a pallet, roller 172 is depressed and bell cranks 174 are rotated about the axis of roller 176 to cause strap 175 to actuate the strikers of two limit switches LS22 and LS25 mounted upon the frame of conveyer 36.

Figure 8:
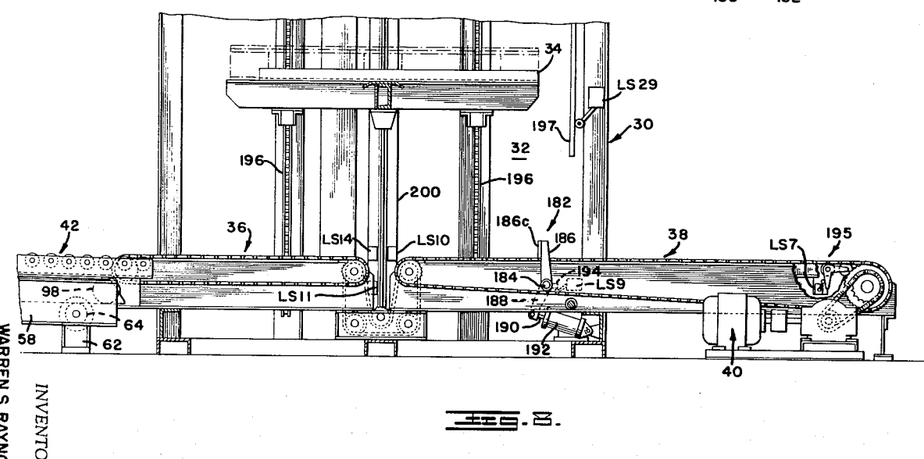
FIG. 8 is a detail cross-sectional view showing the lower portion of the lift shaft and the pallet handling conveyer and associated structure.

To locate loaded pallets in position above the surface of lift platform 34, a pallet stop assembly 182 is supported upon the frame of discharge conveyer section 38. Stop assembly 182 (FIG. 8) includes a transversely extending shaft 184 rotatably supported in the machine frame and having a pair of outer stop arms 186 fixedly mounted upon the shaft for rotation with the shaft closely adjacent each of the chains of conveyer section 38. A crank 188 is secured to shaft 184 on the inside of one of the longitudinal frame members of conveyer 38 and is coupled to the piston rod 190 of an air motor 192 mounted upon the machine frame. A limit switch LS9 is mounted upon the conveyer frame in a position to be actuated by a striker 194 which is fixed to a central stop arm 186C which projects somewhat forwardly of out stop arms 186 (see FIG. 8) and is mounted for a limited amount of lost motion of rotation on shaft 184. In FIG. 8, shaft 184 is shown in one extreme limit of movement to which it is driven by motor 192. In this position, limit switch LS9 is not actuated by striker 194. The lost motion connection between shaft 184 and stop 186C permits stop 186C to be rotated slightly in a clockwise direction from the position shown in FIG. 8, the lost motion connection completing the actuation of limit switch LS9 as the loaded pallet engages outer stops 186. A substantially similar pallet stop mechanism is described in greater detail in my copending application Serial No. 728,243.

At the discharge end of conveyer section 38, a floating roller assembly 195 is mounted to actuate a limit switch LS7 when a discharged empty pallet depresses the roller. Roller assembly 195 is similar to the roller assembly shown in FIG. 7A and will not be described in detail. To prevent inadvertent movement of a loaded pallet past stops 186, a plate 197 is hingedly mounted on the lift shaft frame at the exit side of the shaft. The lower edge of plate 197 is spaced above the chains of conveyer 38 to clear an empty pallet but to engage a carbon supported on a pallet leaving the shaft. Engagement of plate 197 actuates a limit switch LS29, mounted on frame 30 to shut off the machine.

*Pneumatic control system*

Figures 7A, 9:
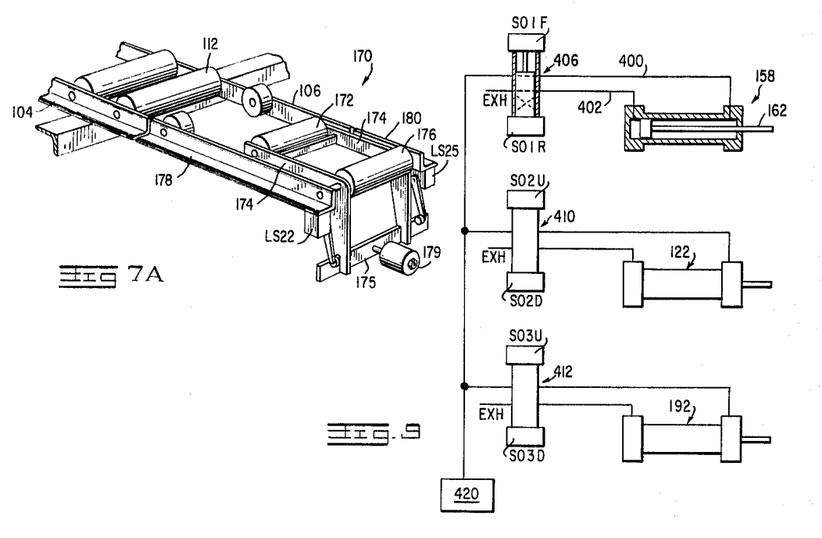
FIG. 7A is an isometric view of the floating roller assembly at the infeed end of the power driven conveyer.
FIG. 9 is a schematic diagram of the pneumatic control circuit.

The pneumatic control system is schematically illustrated in FIG. 9 and is constructed from commercially available components of well known construction. Each of pneumatic motors 158, 122 and 192 is connected to a schematically illustrated pressure source 420 through respective solenoid actuated four way reversing valves 406, 410 and 412, respectively.

Each of valves 406, 410 and 412 includes a pressure port connected to pressure supply conduit 408 and an exhaust port EXH which is vented to atmosphere. In the case of motor 158, valve 406 is provided with two solenoids one solenoid SO1F, when energized, operating to connect rod end conduit 400 to exhaust and to connect head end conduit 402 to pressure conduit 408. When the other solenoid, SO1R is energized, as illustrated in FIG. 9, rod end conduit 400 is connected to pressure conduit 408, while head end conduit 402 is connected to exhaust. Valves 410 and 412 operate in a similar fashion, valve 410 including two solenoids SO2U which, when energized, establishes connections causing the piston rod 124 of motor 122 to extend, thereby elevating the tilting section and solenoid SO2D, when energized, causing rod 124 to retract to lower the tilting section. Valve 412 includes a solenoid SO3U which, when energized, respectively position pallet stop 182 in its up or down position. The characteristics of valves 406, 410 and 412 are such that the valve remains in the position to which it was last actuated, even upon a subsequent de-energization of the solenoid which drove it to the particular position. The valve changes positions only upon actuation of the solenoid connected to drive it to the opposite position.

*Electrical control circuit and operation*

Figure 10:
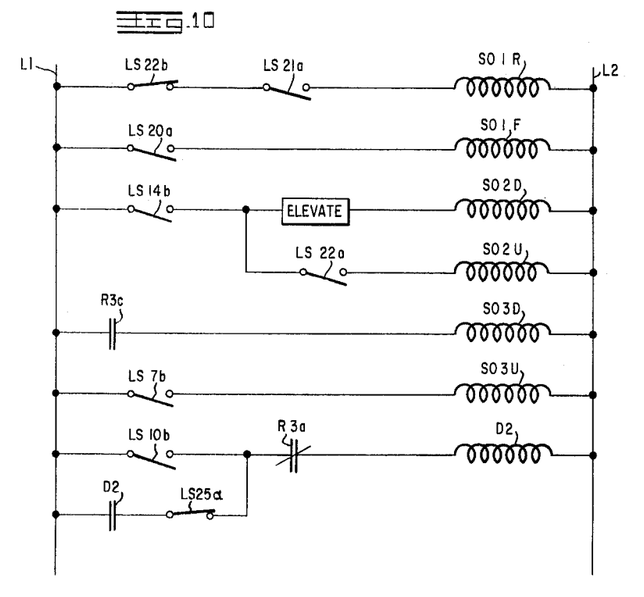
FIG. 10 is a simplified schematic diagram of the electrical control circuit.

Control of the solenoids which operate valves 406, 410 and 412, and of conveyer drive motor 40 is provided by the electrical control circuit schematically illustrated in FIG. 10. Various limit switch contacts shown in FIG. 10 are illustrated in their normal positions—that is, the condition of the contacts when the limit switch striker is not engaged. Reference numerals applied to the various contacts identify the limit switch with which they are associated—thus contacts LS22*b* refer to a set of contacts in limit switch LS22 which are closed at all times except when the striker of limit switch LS22 is depressed. Contacts LS20*a* identify a set of normally open contacts of limit switch LS20 which are open at all times except when the striker of limit switch LS20 is depressed. The various solenoids of valves 406, 410 and 412 appear schematically in FIG. 10, while coil D2 represents a control of motor 40, motor 40 being energized to drive whenever coil D2 is energized.

The function of air motor 158, controlled by solenoids SO1R and SO1F, is to keep conveyer 42 reciprocating constantly at all times unless a loaded pallet is at the discharge end of the conveyer. When a loaded pallet is at the discharge end of conveyer 42, the striker of limit switch LS22 is engaged by the pallet, thus opening contacts LS22*b* to prevent energization of solenoid SO1R, thereby preventing motor 158 from driving in a direction retracting the reciprocating frame from its forwardmost limit of movement. In the absence of the presence of a loaded pallet or stack of articles at the discharge end of conveyer 42, contacts LS22*b* are closed and hence conveyer 42 is continually reciprocated, contacts LS21*a* being closed when the conveyer frame reaches its forwardmost limit of movement to thereby energize solenoid SO1R, causing motor 158 to retract the frame until the frame strikes limit switch LS20 at its rearward limit of movement, thereby closing contacts LS20*a* to energize solenoid SO1F to reverse motor 158. Although contacts LS21*a* and LS20*a* open immediately as the conveyer moves away from its forward or rearward limit of movement, the valve, as described above, remains at its last actuated position until the solenoid contacts causing a reversal of the valve are subsequently closed.

Control of the tilting section, by means of which a single loaded pallet is discharged from conveyer 42, is controlled in the particular example illustrated by the operation and location of pallet lift platform 34. The location of lift platform 34 in position to receive a loaded pallet is detected by two limit switches LS10 and LS14 (FIG. 8) which are located to be actuated by the lift platform when the platform is at its lower limit of movement.

Solenoids SO2D and SO2U which control operation of tilting section motor 122 are connected in the electrical control circuit commonly across supply lines L1 and L2 by a set of normally open contacts LS14*b* which are closed only when the lift is at its lower limit of movement. A set of normally open contacts LS22*a* is connected in series with solenoid SO2D and SO2U will be energized when lift platform 34 is at its lower limit of movement, indicated by closure of contacts LS14*b*, and a loaded pallet is engaged with floating roller 172.

Return of the tilting section to its lower position by energization of solenoid SO2D is controlled by the lift operating system in this particular case, the box designated "elevate" representing a set of contacts which are closed when the lift operating motor 40 is energized to elevate the lift, this latter actuation being in turn dependent upon various conditions of the article unstacking apparatus. These latter conditions are selected to occur at a time wherein no loaded pallet is at the discharge end of conveyor 42 so that contacts LS22*a* will be open when the "elevate" contacts are closed.

Control of the drive motor for infeed conveyors 36–38 is accomplished by a relay D2 which, when energized, causes motor 40 to drive. Relay D2 is energized initially through contacts LS10*b* which are closed upon the arrival of lift platform 34 at its lower limit of movement. Also included in the circuit of relay D2 is a set of contacts designated R3*a* which are normally closed, but which are held open whenever the lift is moving downwardly. Thus, when the lift arrives at its lower limit of movement, contacts LS10*b* and R3*a* close almost simultaneously to energize conveyor drive motor 40 via relay B2.

As a safety precaution, contacts LS10*b* are bypassed by lock-in contacts D2*a* and safety contacts LS25*a*. Contacts LS25*a* are opened by depression of floating roller assembly 170 and remain open as long as assembly 170 is depressed by the entering loaded pallet. Were contacts LS25*a* omitted, it would be possible for relay D2 to be energized by a momentary closing of contacts LS10*b* and relay D2 would then be locked in by contacts D2*a*. In the event of an accidental momentary actuation of contacts LS10*b*, as by a falling carton the subsequent opening of contacts LS10*b* would have no effect on relay D2. This would make it possible for the chains to drive a loaded pallet into the lift when the lift platform was not in position to receive it. Contacts LS25*a* eliminate this possibility of remaining open for the time required to convey the loaded pallet across assembly 170, thus making driving movement of the infeed conveyer chains dependent upon contacts LS10*b* which are closed only when the lift is in position to receive the pallet.

As the loaded pallet passes from the tilting section onto the infeed conveyer, floating roller 172 remains depressed, hence contacts LS22*b* remain open to open the circuit to solenoid SO1R to prevent the reciprocating frame from being withdrawn from its forwardmost position during the transfer of the loaded pallet from conveyor 42 to infeed conveyor 46.

Because apron 44 is in its fully retracted position, relay R–1 and parallel connected relay TDR1 are both energized at this time, since normally opened contacts LS16*a* are closed by virtue of the fact that the striker of limit switch LS16 is engaged by the apron. Since contacts R1*a* are closed the circuit through lift motor control relay D1U is in condition to be energized upon the closing of contacts LS9*a*. Contacts LS9*a* closed upon the slight rotative movement of center stop arm 186C when the arm 186C is engaged by the entering loaded pallet. Thus, as the loaded pallets arrives in the position over lift platform 34, contacts LS9*a* are closed and a circuit is completed through contacts R1*a*, normally closed contacts LS18*a*, LS13*a*, normally open contacts LS26*a* (closed now by the presence of pusher plate 208 in its retracted position) on contacts D1D*a* to energize relay D1U. When relay D1U is energized, it actuates lift drive motor 198 to drive chains 196 in a direction elevating lift platform 34 and hence the loaded pallet.

Control of pallet stop 182 is accomplished by motor 192 which, in turn, is controlled by solenoids SO3D and SO3U. Solenoid SO3D is energized upon closure of contacts R3c which are closed when lift platform 34 is moving downwardly. Thus, as the lift platform is lowered, solenoid SO3D actuates motor 192 to drive in a direction retracting stop 182. If a pallet is supported upon the lowering lift platform, as soon as the platform reaches its lower limit of movement, conveyers 36 and 38 are driving and the lowered stop 182 permits the empty pallet to be driven out of the lift shaft—that is, to the right as viewed in FIG. 8. Stop 182 remains retracted until the empty pallet reaches the right-hand end of conveyer section 38, at which time the striker of limit switch LS7 is depressed to close contacts LS7b which energize solenoid SO3U to reverse motor 192. This action drives stop 182 back to its elevated position as shown in FIG. 8 in time to be contacted by the incoming loaded pallet.

In the article unstacking machine described in greater detail in my copending application Serial No. 54,997, the incoming loaded pallet, when it engages stop 182, actuates limit switch LS9 (FIG. 8) and actuation of limit switch LS9 is employed to initiate elevating movement of the lift platform. This action closes the "elevate" contacts in circuit with solenoid SO2B thereby lowering the tilting section of conveyer 42 as the lift platform 34 starts upwardly. Reciprocation of conveyer 42 will occur under the control of limit switches LS21 and LS20 until another loaded pallet is conveyed to the discharge end of conveyer 42, at which time contacts LS22b will be opened as described above.

While I have described but one embodiment of my invention, it will be apparent to those skilled in the art that the disclosed embodiment may be modified. Therefore, the foregoing description is to be considered exemplary rather than limiting and the true scope of the invention is that defined in the following claims.

I claim:

1. In an apparatus for unloading articles stacked upon a pallet including lift means for raising and lowering pallets within a lift shaft, and means cooperable with said lift means for removing articles stacked upon a pallet supported by said lift means; conveyer means for supplying a loaded pallet to said lift means when said lift means is located at a selected elevation within said shaft comprising a storage conveyer for supporting a line of loaded pallets, normally energized drive means operable when energized to drive pallets supported on said storage conveyer toward the discharge end thereof, retractable stop means at said discharge end of said storage conveyer normally located in an extended position to prevent movement of pallets beyond the discharge end of said storage conveyer, an infeed conveyer for conveying pallets from the discharge end of said storage conveyer to said lift means, discharge means responsive to the arrival of said lift means at said selected elevation for retracting said stop means and transferring a pallet from said storage conveyer to said infeed conveyer, and means for deenergizing said drive means during the transfer of a pallet from said storage conveyer to said infeed conveyer.

2. Article handling apparatus for supplying articles to a receiving device positionable at a predetermined location comprising a storage conveyer, normally energized drive means operable when energized to drive articles toward the discharge end of said storage conveyer, an infeed conveyer for conveying articles from the discharge end of said storage conveyer to said predetermined location, a discharge section located at said discharge end of said storage conveyer, means supporting said discharge section for tilting movement between a normal position wherein said discharge section defines a continuation of the conveying surface of said storage conveyer and an actuated position wherein said section is inclined downwardly toward said discharge end to gravitationally transfer articles supported on said discharge section to said infeed conveyer, retractable stop means mounted at the discharge end of said discharge conveyer cooperable with said discharge section to prevent movement of articles from said discharge section when said discharge section is in said actuated position, means actuable by said device when in said predetermined location for driving said discharge section from said normal position to said actuated position to transfer articles to said infeed conveyer, means on said infeed conveyer for de-energizing said drive means upon movement of said articles onto said infeed conveyer and for energizing said drive means and returning said discharge section to said normal position when said article reaches a predetermined location upon said infeed conveyer.

3. A conveyer assembly comprising a longitudinally extending first frame, a plurality of rollers mounted in said first frame for rotation about axes extending transversely of said first frame to define a conveying surface terminating short of the discharge end of said first frame, a second frame, means mounting said second frame upon said first frame for pivotal movement relative to said first frame about an axis extending transversely across the discharge end of said first frame, a plurality of rollers mounted in said second frame for rotation about axes extending transversely of said first frame, means on said second frame engageable with said first frame to support said second frame at a rest position wherein the rollers of said second frame define a continuation of said conveying surface, retractable stop means mounted on said first frame to normally extend above the rollers for preventing articles from moving beyond said discharge end of said first frame when said second frame is in said rest position, means for tilting said second frame upwardly about said pivotal axis from said rest position, and means on said second frame engageable with said stop means to retract said stop means below the rollers when said second frame is tilted upwardly from said rest position and permit said stop means to remain below the rollers when said second frame returns to its at rest position.

4. A conveyer assembly comprising a longitudinally extending first frame, a plurality of rollers mounted in said first frame for rotation about axes extending transversely of said first frame to define a conveying surface terminating short of the discharge end of said first frame, means supporting said first frame for longitudinal reciprocating movement with said conveying surface inclined downwardly toward said discharge end, means for driving said first frame in said reciprocating movement, a second frame, means mounting said second frame upon said first frame for pivotal movement relative to said first frame about an axis extending transversely across the discharge end of said first frame, a plurality of rollers mounted in said second frame for rotation about axes extending transversely of said first frame, means on said second frame engageable with said first frame to support said second frame at a rest position wherein the rollers of said second frame define a continuation of said conveying surface, retractable stop means mounted on said first frame for preventing articles from moving beyond said discharge end of said first frame when said second frame is in said rest position, first means connected to said drive means to normally energize said drive means to drive articles supported upon said conveying surface toward said stop means, second means mounted on said first frame for tilting said second frame upwardly from said rest position, means on said second frame engageable with said stop means to retract said stop means when said second frame is tilted upwardly from said rest position whereby articles supported upon the rollers of said second frame are gravitationally discharged from said conveyer assembly, and means for de-energizing said drive means until an article discharged from said discharge section reaches a predetermined location clear of said second frame.

References Cited by the Examiner

UNITED STATES PATENTS

| | | | |
|---|---|---|---|
| 1,877,934 | 9/1932 | Milbrath | 198—26 |
| 1,969,994 | 8/1934 | Stevenson | 198—35 |
| 2,619,238 | 11/1952 | Miller | 214—306 |
| 2,700,449 | 1/1955 | Gleason | 198—27 |
| 2,790,567 | 4/1957 | Rockhill | 198—26 X |
| 3,038,615 | 6/1962 | Roth | 214—8.5 |

GERALD M. FORLENZA, *Primary Examiner.*

MORRIS TEMIN, HUGO O. SCHULZ, *Examiners.*

UNITED STATES PATENT OFFICE
CERTIFICATE OF CORRECTION

Patent No 3,257,007

June 21, 1966

Warren S. Raynor

It is hereby certified that error appears in the above numbered patent requiring correction and that the said Letters Patent should read as corrected below.

In the grant, lines 2 and 3, for "assignor to Mathews Conveyer Company, of Ellwood City, Pennsylvania, a corporation of Pennsylvania" read -- assignor to Rex Chainbelt Inc., a corporation of Wisconsin --; line 12, for "Mathews Conveyer Company," read -- Rex Chainbelt Inc., --; in the heading to the printed specification, lines 4 to 6, for "assignor to Mathews Conveyer Company, Ellwood City, Pa., a corporation of Pennsylvania" read -- assignor to Rex Chainbelt Inc., a corporation of Wisconsin --.

Signed and sealed this 26th day of September 1967.

(SEAL)
Attest:

ERNEST W. SWIDER
Attesting Officer

EDWARD J. BRENNER
Commissioner of Patents